(12) United States Patent
Heutchy

(10) Patent No.: US 10,072,778 B2
(45) Date of Patent: Sep. 11, 2018

(54) TUBE NUT ASSEMBLY

(71) Applicant: Toyota Motor Engineering & Manufacturing North America, Inc., Erlanger, KY (US)

(72) Inventor: Andrew W. Heutchy, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 167 days.

(21) Appl. No.: 14/592,599

(22) Filed: Jan. 8, 2015

(65) Prior Publication Data

US 2016/0201841 A1    Jul. 14, 2016

(51) Int. Cl.
*F16L 19/028* (2006.01)
*F16L 19/02* (2006.01)
*F16L 58/18* (2006.01)
*B60T 17/04* (2006.01)

(52) U.S. Cl.
CPC ........ *F16L 19/0243* (2013.01); *B60T 17/043* (2013.01); *F16L 19/028* (2013.01); *F16L 58/184* (2013.01)

(58) Field of Classification Search
CPC .. F16L 19/0243; F16L 19/028; F16L 19/0286
See application file for complete search history.

(56) References Cited

U.S. PATENT DOCUMENTS

| | | | |
|---|---|---|---|
| 1,810,877 A * | 6/1931 | Dearing | F16K 3/06 251/302 |
| 3,325,192 A | 6/1967 | Sullivan | |
| 6,109,660 A * | 8/2000 | Akiyama | F16L 19/0283 285/226 |
| 6,475,297 B1 | 11/2002 | Rafferty et al. | |
| 6,663,146 B1 * | 12/2003 | Sakai | F16L 19/0286 285/148.26 |
| 7,520,102 B1 | 4/2009 | diGirolamo et al. | |
| 7,533,909 B2 * | 5/2009 | Sausner | F02M 55/005 285/353 |
| 7,789,433 B2 * | 9/2010 | Calnek | F16L 19/0283 285/334.5 |
| 7,922,065 B2 | 4/2011 | Sutherlin et al. | |

(Continued)

FOREIGN PATENT DOCUMENTS

EP    1538240 B1    5/2010

OTHER PUBLICATIONS

Ahmad, Zaki. Principles of Corrosion Engineering and Corrosion Control. pp. 42, 43, 131, 132, 133, 382, 383, 405, and 406, Oxford: Elsevier, 2006. Print.*

*Primary Examiner* — David Bochna
*Assistant Examiner* — James A Linford
(74) *Attorney, Agent, or Firm* — Dinsmore & Shohl LLP

(57) ABSTRACT

A tube nut and a brake tube assembly are provided. A pipe is disposed within the bore of the nut. A first coating is disposed on an outer surface of the nut. The first coating has a corrosive resistance greater than the bore so as to promote corrosion within the bore. The corrosion forms a seal which is pinched between the bore and the pipe. The tube nut and brake tube assembly may include a second coating disposed on the bore. The first coating has a corrosive resistance greater than the second coating so as to promote corrosion within the bore.

8 Claims, 3 Drawing Sheets

(56) References Cited

U.S. PATENT DOCUMENTS

| | | |
|---|---|---|
| 2002/0092717 A1 | 7/2002 | Brumfield |
| 2005/0087984 A1* | 4/2005 | Weick .................... F16L 19/04 285/334.2 |
| 2009/0324363 A1* | 12/2009 | Abbott ................ F16L 19/0286 411/378 |
| 2010/0233471 A1 | 9/2010 | Hayes et al. |
| 2015/0354735 A1* | 12/2015 | Stahn .................... F16L 19/00 285/94 |

* cited by examiner

TUBE NUT ASSEMBLY

TECHNICAL FIELD

A tube nut assembly configured to generate a seal between the tube and the nut is provided.

BACKGROUND OF THE INVENTION

Tube nut assemblies are used to provide fluids to a mechanical component. In particular the tube nut assembly is configured to form a sealed engagement with a mating joint. The mating joint includes a passage in fluid communication with the mechanical component.

The tube nut assembly includes a nut and a pipe. The nut includes a bore and the pipe is disposed within the bore. The pipe includes a flared end. The flared end is pinched between a distal end of the nut and a mating surface of the mating joint so as to provide fluid communication through the pipe to a mechanical component.

The outer surface of the pipe is spaced apart from the inner surface of the bore. Thus, the pipe and the flared end which is compressed may be exposed to a corrosive environment, as shown in FIG. 1. For instance, in automotive application water, gas, and fumes may be deposited in the space between the bore and the pipe. The corrosive elements may come in contact with the flared end causing corrosion to occur, which in turn may damage the integrity of the seal created between the flared end and the seating surface of the mating joint.

Accordingly, it is known to dip the nut in a corrosive resistant solution so as to prevent corrosion within the bore and to help maintain the sealed engagement between the flared end and the mating joint. However, the gap between the pipe and the bore allows for particulates such as exhaust gas, water, and the like to come into contact with the flared end. Accordingly, it remains desirable to provide a tube nut assembly having a seal so as to close off the space between the pipe and the bore.

SUMMARY OF THE INVENTION

A tube nut assembly and a brake tube assembly configured to generate a seal so as to prevent a flared end of a pipe from exposure to the environment are provided. The tube nut assembly includes a pipe and a nut. The nut is made of a metallic element or alloy and includes a head and a bore. The bore defines a top opening disposed at the head of the nut and a bottom opening. The bore extends axially along the body of the nut.

The pipe is disposed within the bore of the nut. The pipe includes a first passage. A distal end of the pipe includes a flared end. The flared end is configured to engage a seating surface of a mating joint. The outer surface of the pipe is spaced apart from the inner wall defining the bore of the nut.

The tube nut assembly includes a first coating disposed on the outer surface of the nut. The first coating has a corrosive resistance greater than the inner wall of the nut defining the bore so as to promote corrosion within the bore. Thus, the corrosion which is formed on the inner walls of the bore expands and encroaches upon the outer surface of the pipe so as to form a seal preventing environmental hazards such as exhaust, water, oil, or debris from coming into contact with the flared end of the tube nut assembly.

A brake tube assembly is also provided. The brake tube assembly includes a nut and a pipe. The pipe is disposed within the bore of the nut and the nut is configured to engage an opening of a mating joint. The pipe has a flared end. The flared end of the pipe protrudes from a distal end of the nut and is configured to be pinched between a distal end of the nut and a seating surface of the mating joint.

The mating joint includes a second passage in fluid connection with a mechanical component. The second passage is coaxial to the first passage of the pipe so as to provide a continuous passage for fluids such as brake fluid. The pipe is disposed within the bore. The nut is coupled to the mating joint wherein the flared end of the pipe is pinched between the seating surface and the nut.

A first coating is disposed on an outer surface of the nut. The first coating has a corrosive resistance greater than the bore so as to promote corrosion within the bore. The corrosion forms a seal which is pinched between the bore and the outer surface of the pipe. The tube brake assembly may further include a second coating. The second coating is disposed on the bore. The second coating has a corrosive resistance less than the corrosive resistance of the first coating. Accordingly, corrosion occurs within the bore at a quicker rate than corrosion on the outer surface of the nut. The corrosion within the bore forms a seal that expands radially inward so as to encroach and pinch up against the outer surface of the pipe. The seal prevents environmental particulates from coming into contact with the flared end of the pipe.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

DETAILED DESCRIPTION OF THE PREFERRED EMBODIMENTS

A tube nut assembly and a brake tube assembly configured to generate a seal to protect the flared end of the pipe from exposure are provided. The seal is formed by promoting corrosion within a bore of the nut. The corrosion butts against the outer surface of the pipe, forming the seal which prevent particulates in the environment from coming into contact with the flared end of the pipe.

Both the tube nut assembly and the brake tube assembly have a pipe and a nut. The nut includes a bore extending longitudinally along the body of the nut. The nut is made of a metallic element or alloy which is susceptible corrosion when exposed to certain particulates such as salt and oxygen. Any metallic element susceptible to corrosion may be adapted for use herein, illustratively including steel, or a steel composite. The nut includes a head and a bore. The pipe is disposed within the bore. The outer surface of the pipe is spaced apart from the inner surface of the bore. A distal end of the pipe includes a flared end. The flared end is configured to provide a seal with a seating surface of a receiving mating joint.

The outer surface of the nut includes a first coating. The first coating is resistant to corrosion. The first coating may be a solution or plating which resists corrosion. Any solution or plating currently known or used in the art may be adaptable for use herein, illustratively including a zinc plating or a chromate plating, or a combination of both. The bore has a resistance to corrosion which is less than the first coating. Thus, corrosion is formed first within the bore. The corroded metal of the bore expands outwardly and engages the outer surface of the pipe so as to form a seal protecting the flared end from the environment.

Figure 1:
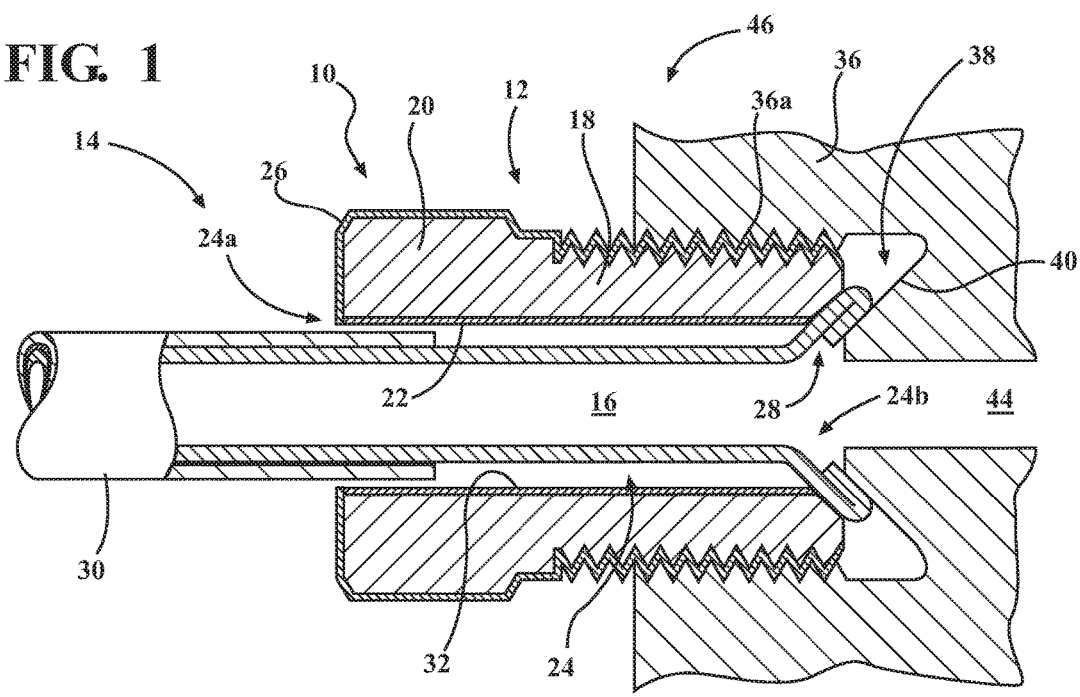
FIG. 1 is a cross-sectional view of the tube nut assembly.

With reference now to FIG. 1, a cross-sectional view of a tube nut assembly 10 is provided. The tube nut assembly 10 includes a nut 12 and a pipe 14. The nut 12 is formed of a metallic element or alloy which is subject to corrosion. The pipe 14 includes a first passage 16 configured to provide fluids to a mechanical part.

The nut 12 includes a body 18 and a head 20. The head 20 may be dimensioned so as to be adapted for engagement with a wrench. For instance, the head 20 may have a hexagonal shape. The body 18 is cylindrical and includes an inner wall 22 defining a bore 24. The bore 24 defines a top opening 24a at the head 20 of the nut 12 and a bottom opening 24b at the distal end of the body 18. The nut 12 includes a first coating 26 applied to the outer surface of the nut 12. The first coating 26 has a first corrosive resistance. The first corrosive resistance is greater than the corrosive resistance of the inner wall 22 so as to promote corrosion within the bore 24.

It should be appreciated that the rate of corrosion will be influenced by the type of metallic material used to make the nut, the type of solution used to make the first coating 26, and the environment in which the tube nut assembly 10 is used. For instance, assume the nut 12 is placed in an environment containing salt water and gasoline fumes. Further assume that the inner wall 22 is left untreated, the nut 12 is made of steel, and the outer surface of the nut has a first coating 26 made of both a zinc and chromate plating. In such an example, the inner wall 22 may begin to show signs of corrosion after approximately 20 hours, whereas the outer surface of the nut 12 may show signs of corrosion after approximately 100 hours. Alternatively, assuming the same environment as above, in a nut 12 wherein the outer surface has a first coating 26 made of both a zinc and chromate plating and an the inner wall 22 may having a second coating 32 made of zinc plating, the inner wall 22 will show signs of corrosion after approximately 40 hours.

The pipe 14 may be formed of a material conducive for the transfer of fluids such as brake fluid, or fuel. The pipe 14 is a generally cylindrical member having an outer surface 14a. A distal end of the pipe 14 is flared, so as to define a flared end 28. The flared end 28 is configured to protrude outwardly from the bottom opening 24b of the body 18 of the nut 12.

The pipe 14 may include a sleeve 30. The sleeve 30 is configured to protect the pipe 14 from exposure to the environment so as to help prevent corrosion. The sleeve 30 may be formed of a pliable material such as rubber, which also provides a protective surface to help reduce damage from contact. The distal end of the surface of the inner wall 22 of the body 18 of the nut 12 may be angled so as to accommodate the flared end 28 portion of the pipe 14.

The tube nut assembly 10 may further include a second coating 32. The second coating 32 is disposed on the surface of the inner wall 22. The first coating 26 has a corrosive resistance greater than the second coating 32 so as to promote corrosion within the bore 24. Specifically, the second coating 32 is designed to promote corrosion within the bore. Thus, in some instance, it may be desirable to leave the inner wall 22 untreated. The flared end 28 of the pipe 14 abuts against the slanted surface of the inner wall 22 of the bore 24.

Figure 2:
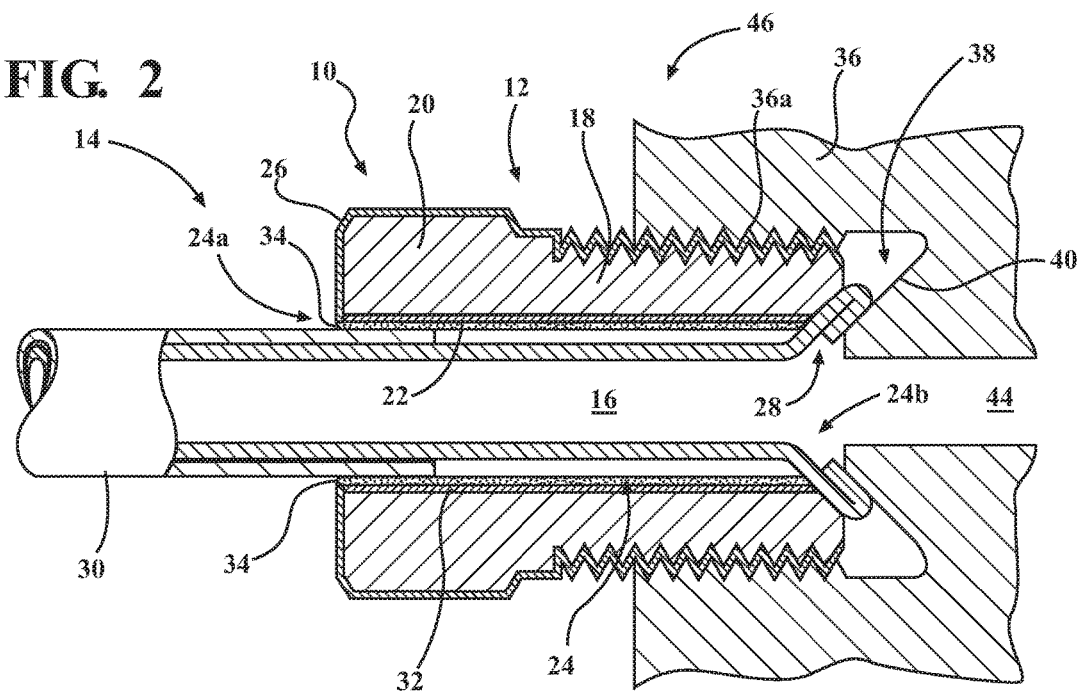
FIG. 2 is a cross-sectional view of the tube nut assembly of FIG. 1 after a period of time has lapsed.

With reference now to FIG. 2, a cross-sectional view of FIG. 1 is provided, wherein a period of time has lapsed sufficient for corrosion to occur. The cross-sectional view shows the first coating 26 applied to the outer surface of the nut 12. The inner wall 22 is treated with a second coating 32 having a corrosive resistance less effective than the corrosive resistance of the first coating 26. The inner wall 22 of the nut 12 is spaced apart from an outer surface of the pipe 14. As time has lapsed, corrosion occurs within the bore 24. As the metallic bore 24 corrodes, the metal expands onto the outer surface of the sleeve 30 forming a seal 34.

Figure 3:
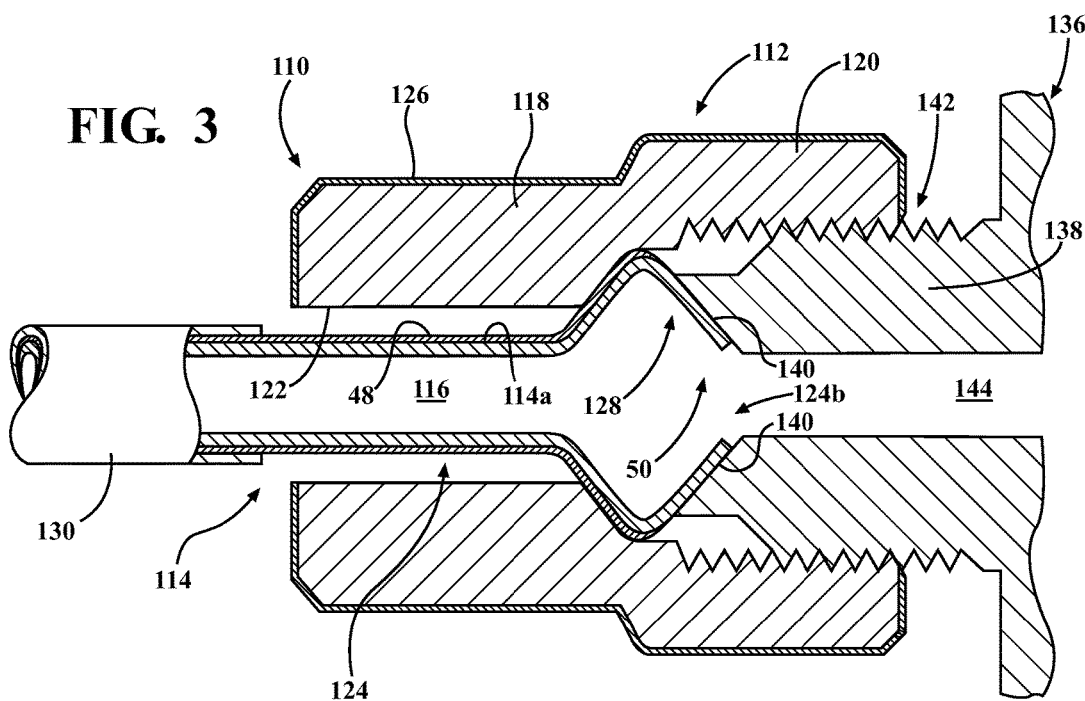
FIG. 3 is a cross-sectional view of a tube nut assembly with a bulb.

With reference now to FIG. 3, a cross-sectional view of an alternative embodiment of the tube nut assembly 110 is provided, wherein like elements are number with like reference numbers increased by 100. The tube nut 112 has an inner wall 122 defining a bore 124. The inner wall 122 of the bore 124 diametrically opposed to the head 120 is threaded.

The tube nut assembly 10 includes a pipe 114. The distal end of the pipe 114 includes a flared end 128. The flared end 128 is shown as a bulb 50. A third coating 48 is provided on top of the outer surface 114a of the pipe 114. A sleeve 130 is mounted onto a proximal end of the pipe 114. A portion of the pipe 114 between the sleeve 130 and the flared end 128 is exposed and disposed within the bore 124. The portion of the pipe 114 is spaced apart from the inner wall 122 of the bore 124. The outer surface of the nut 112 is covered with a first coating 126 having a first corrosive resistance. The inner wall 122 is not treated.

The nut 112 is mounted to a mating joint 136. The mating joint 136 includes a mating portion 138 having a seating surface 140 configured to seat with an outer surface of the flared end 128. The mating joint 136 includes a threaded shaft 42. A second passage 144 extends axially within the threaded shaft 42. The threaded shaft 42 is configured to engage the threaded bore 24 of the nut 12 so as to fluidly connect the first and second passages 116, 144.

Figure 4:
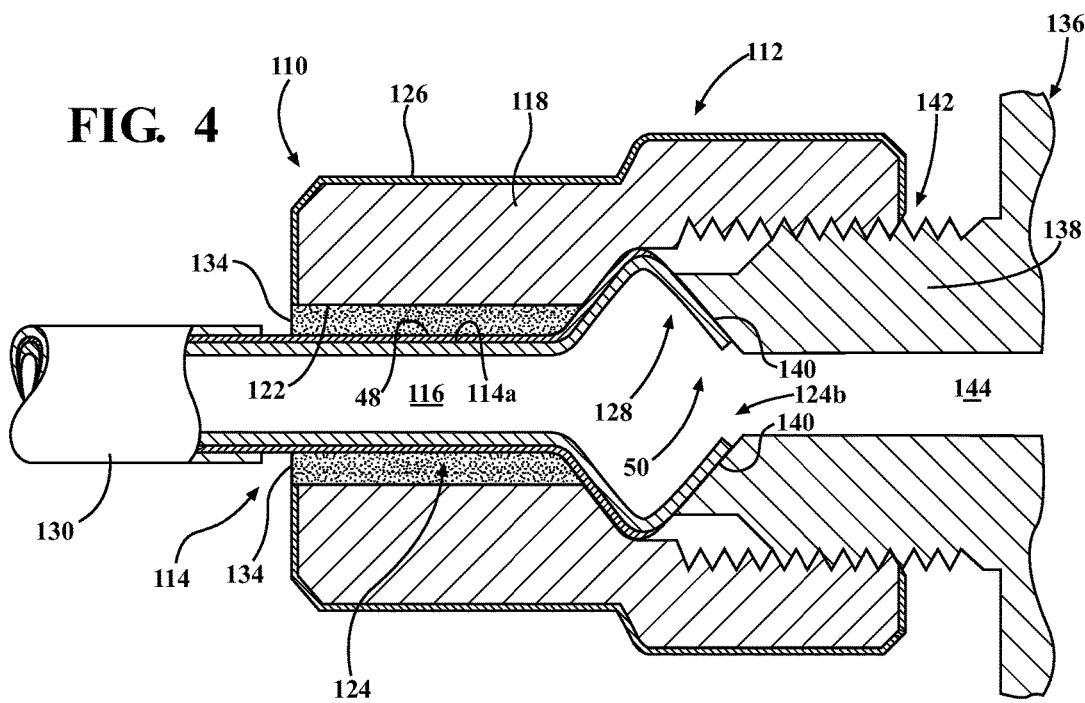
FIG. 4 is a cross-sectional view of the tube nut assembly of FIG. 3 after a period of time has lapsed.

With reference now to FIG. 4 a view of FIG. 3 is provided wherein time has lapsed. A seal 134 is formed between the third coating 48 of the pipe 114 and the inner wall 122 of the nut 112. The seal 134 is formed from corrosion occurring along the bore 124. The corrosion extends radially and abuts against the outer surface of the pipe 114. The seal 134 prevents the flared end 128 of the pipe 114 from being exposed to the environment.

With reference now to FIGS. 1-2, a brake tube assembly 46 is provided. The brake tube assembly 46 includes a tube nut assembly 10 mounted to a mating joint 36. The tube nut assembly 10 includes a nut 12 and a pipe 14. The mating joint 36 includes an opening configured to receive the nut 12. The nut 12 may have a threaded outer surface and the opening of the mating joint 36 may have a threaded inner wall 36a configured to receive the threaded outer surface of the nut 12 so as to hold the but within the mating joint 36. The mating joint 36 includes a seating surface 40.

As shown, the seating surface 40 is generally a cone-shaped surface and is configured to engage the inner surface of the flared end 28 of the pipe 14. A second passage 44 is provided within the mating joint 36 so as to provide fluid connection from the brake tube to the brake mechanism.

The nut 12 includes a bore 24. The bore 24 is defined by a surface of the inner wall 22 and is generally cylindrical. The pipe 14 includes a flared end 28. The outer surface of the flared end 28 abuts against the surface of the inner wall 22 of the bore 24 and a portion of the flared end 28 protrudes from a distal end of the body 18 of the nut 12.

The pipe 14 may include a sleeve 30 mounted to the outer surface of the pipe 14 wherein a neck portion of the pipe 14 may remain exposed, the neck portion being the portion of the pipe 14 disposed between the distal end of the sleeve 30 and a proximal end of the flared end 28 of the pipe 14. The inner surface of the flared end 28 of the pipe 14 abuts against the seating surface 40 so as to pinch the flared end 28 between the seating surface 40 of the mating joint 36 and the distal end of the body 18 of the nut 12.

The outer surface of the nut 12 is coated with a first coating 26 and the inner wall 22 defining the bore 24 may be left untreated or alternatively, may include a second coating 32. The first coating 26 has a corrosive resistance which is greater than the bore 24 or in the event of a second coating 32 is greater than the second coating 32 so as to promote corrosion within the bore 24.

As shown in FIG. 2, time has lapsed and the corrosion is formed wherein the corrosion expands the metal of the bore 24 and the expanded corroded metal abuts against an outer surface of the sleeve 30 and provides a seal 34 which prevents water and other environmental substances from coming into contact with the flared end 28.

Figure 5:
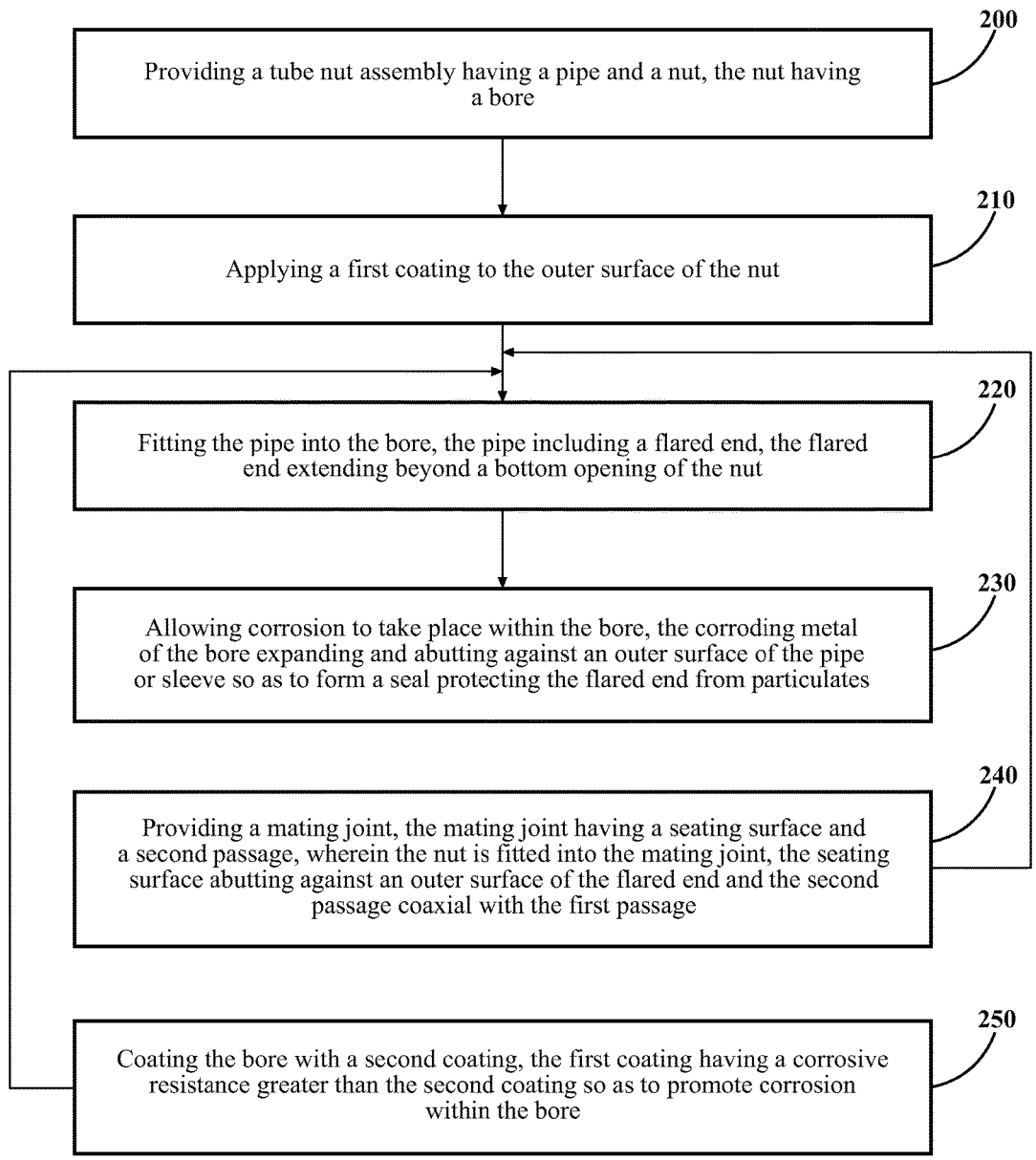
FIG. 5 is a diagram showing the steps of a method of forming a seal in a tube nut assembly.

With reference now to FIG. 5, a method 200 for forming a seal in a tube nut assembly 10 is provided. The tube nut assembly 10 includes a nut 12 and a pipe 14. The nut 12 is formed of a metallic element or alloy which is subject to corrosion. The pipe 14 includes a first passage 16 configured to provide fluids to a mechanical part.

The nut 12 includes a body 18 and a head 20. The head 20 may be dimensioned so as to be adapted for a wrench. For instance, the head 20 may have a hexagonal shape. The body 18 is cylindrical and includes an inner wall 22 defining a bore 24. The bore 24 defines a top opening 24a at the head 20 of the nut 12 and a bottom opening 24b at the distal end of the body 18.

The method 200 begins with step 210 wherein a first coating 26 is applied to the outer surface of the nut 12. The first coating 26 has a first corrosive resistance. The corrosive resistance is greater than the corrosive resistance of the inner wall 22 so as to promote corrosion within the bore 24.

The method 200 then proceeds to step 220 wherein the pipe 14 is slid into the bore 24 of the nut 12. The flared end 28 is positioned so as to extend beyond the bottom opening 24b of the nut 12. The method 200 then proceeds to step 230 wherein time is allowed to lapse so as to allow corrosion to take place within the bore 24. The corroding metal of the bore expanding and abutting against the outer surface of the pipe 14 as shown in FIG. 4, or the outer surface of the sleeve 30 as shown in FIG. 2, so as to form a seal 34.

The method 200 may include step 240 wherein the nut 12 is fitted to a mating joint 36. The mating joint 36 having a seating surface 40 and a second passage 44. The second passage 44 is coaxial with the first passage 16. The seating surface abuts against an outer surface of the flared end 28 so as to form a sealed engagement between the pipe 14 and the mating joint 36.

The method 200 may further include step 250 wherein the inner wall 22 of the nut 12 is coated with a second coating 32. The first coating 26 has a corrosive resistance greater than the second coating 32 so as to promote corrosion within the bore 24.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

I claim:

1. A tube nut assembly comprising:
   a pipe;
   a nut having an inner wall defining a bore, the pipe disposed within the bore;
   a first coating disposed directly on an outer surface of the nut, the first coating having a corrosive resistance greater than the inner wall defining the bore;
   a second coating disposed directly on the inner wall of the bore, the second coating having a corrosive resistance less than the first coating, the second coating being different from the first coating; and
   a corrosion seal formed from corrosion developed from the inner wall, the corrosion seal pinched between the inner wall of the bore and an outer surface of the pipe, wherein the second coating promotes the corrosion of the inner wall to form the corrosion seal.

2. The tube nut assembly as set forth in claim 1, wherein the pipe includes a flared end, the bore defining a top opening and bottom opening of the nut, the nut having a head disposed on the top opening, the flared end of the pipe protruding from the bottom opening.

3. The tube nut assembly as set forth in claim 2, wherein the pipe includes a sleeve, the sleeve is mounted to the pipe and disposed above the head of the nut.

4. The tube nut assembly as set forth in claim 3, wherein the sleeve has a distal end, the distal end of the sleeve is spaced part from the flared end of the pipe.

5. The tube nut assembly as set forth in claim 2, wherein the nut is formed of a metallic material and wherein the first coating is one of either a zinc plating or a chromate plating.

6. The tube nut assembly as set forth in claim 2, wherein the second coating is zinc plating.

7. A method for forming a seal within a tube nut assembly, the tube nut assembly having a pipe and a nut, the pipe having a first passage, the nut having an inner wall defining a bore, the method comprising the steps of:
   applying a first coating directly on the outer surface of the nut, the first coating having a corrosive resistance greater than the inner wall defining the bore;
   applying a second coating directly on the inner wall of the bore, the second coating having a corrosive resistance less than the first coating, the second coating being different from the first coating;
   fitting the pipe into the bore, the pipe including a flared end, the flared end extending beyond a bottom opening of the nut; and
   allowing corrosion to take place within the bore, the corroding metal of the bore expanding and abutting against the outer surface of the pipe so as to form a corrosion seal, wherein the corrosion seal is pinched between the inner wall of the bore and an outer surface of the pipe, wherein the second coating promotes the corrosion of the inner wall to form the corrosion seal.

8. The method as set forth in claim 7, further including the step of providing a mating joint, the mating joint having a seating surface and a second passage, wherein the nut is fitted into the mating joint, the seating surface abutting against an outer surface of the flared end and the second passage coaxial with the first passage.

* * * * *